(12) United States Patent
Azuma

(10) Patent No.: US 6,330,559 B1
(45) Date of Patent: Dec. 11, 2001

(54) MERGE SORTING APPARATUS WITH COMPARISON NODES CONNECTED IN TOURNAMENT TREE SHAPE

(75) Inventor: Shinsuke Azuma, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/330,098

(22) Filed: Jun. 11, 1999

(30) Foreign Application Priority Data

Jun. 19, 1998 (JP) .................................................. 10-173355

(51) Int. Cl.⁷ ............................... G06F 7/00; G06F 17/30
(52) U.S. Cl. ............................ 707/7; 707/200; 707/530; 235/375; 235/436; 340/146.2
(58) Field of Search ........................... 707/7; 708/3, 104, 708/713, 801

(56) References Cited

U.S. PATENT DOCUMENTS

| | | | |
|---|---|---|---|
| 4,706,082 | 11/1987 | Miesterfeld et al. | 340/825.5 |
| 4,719,458 | 1/1988 | Miesterfeld et al. | 340/825.5 |
| 5,079,736 | 1/1992 | Kitsuregawa et al. | 395/600 |
| 5,210,870 | * 5/1993 | Baum et al. | 395/600 |
| 5,287,494 | 2/1994 | Garcia et al. | 395/600 |
| 5,619,693 | * 4/1997 | Troisi | 395/607 |
| 5,710,937 | * 1/1998 | Kasahara | 395/800 |
| 5,855,016 | * 12/1998 | Edem et al. | 707/7 |

FOREIGN PATENT DOCUMENTS

| | | |
|---|---|---|
| 1161941 | 6/1989 | (JP) . |
| 4180124 | 6/1992 | (JP) . |
| 799513 | 10/1995 | (JP) . |
| 7111677 | 11/1995 | (JP) . |
| 8129478 | 5/1996 | (JP) . |

OTHER PUBLICATIONS

Yi Pan et al. : "Quicksort on a linear array with a reconfigurable pipelined bus system", Jun. 12–14, 1996, IEEE Cat. No. 96TB100044, pp. 313–319.*
Guang–Sheen et al.: "Parallel merge module for combine sort list", May 1996, IEEE vol. 136 issue: 3, pp. 161–165.*
Kitsuregawa et al., "VLSI Sort Processor", Institute of Industrial Science, vol. 31, No. 4, Apr. 1990, pp. 457–465.
Kitsuregawa et al., "VLSI Sort Processor", Institute of Industrial Science, vol. 31, No. 4, Apr. 1990, (translation of abstract).

* cited by examiner

Primary Examiner—Thomas Black
Assistant Examiner—Jacques Veillard
(74) Attorney, Agent, or Firm—Leydig, Voit & Mayer, Ltd.

(57) ABSTRACT

A merge sorting apparatus includes a comparison tournament circuit including comparison nodes, and a comparison control circuit for supplying to the corresponding comparison nodes validity flag information concerning the input data to each of the comparison nodes determined based on comparison results from the comparison nodes. The comparison control circuit includes comparison result registers for retaining the comparison results, validity flag registers for retaining the validity flag information, and merge member registers for retaining information as to whether the input data to each of the input registers corresponding to respective pathways should be the object of comparison in the following data comparison processing. With this arrangement, contending readouts of record arrays from a memory can be reduced and the necessity to initialize each register is eliminated, thereby speeding merge sorting.

13 Claims, 6 Drawing Sheets

Fig. 3(a) CONDITION FOR SIGNAL R GENERATION

| COMPARISON RESULT IN COMPARATOR | R (2-bit BINARY NUMBER) |
|---|---|
| X<Y | 10 |
| X>Y | 01 |
| X=Y | 00 |

Fig. 3(b) SELECTING CONDITION FOR SELECTOR

| V (2-bit BINARY NUMBER) | R (2-bit BINARY NUMBER) | OUTPUT Z |
|---|---|---|
| 10 | DON'T CARE | X |
| 01 | DON'T CARE | Y |
| 11 | 10 | X |
|  | 01 | Y |
|  | 00 | X or Y |
| 00 | DON'T CARE | X or Y |

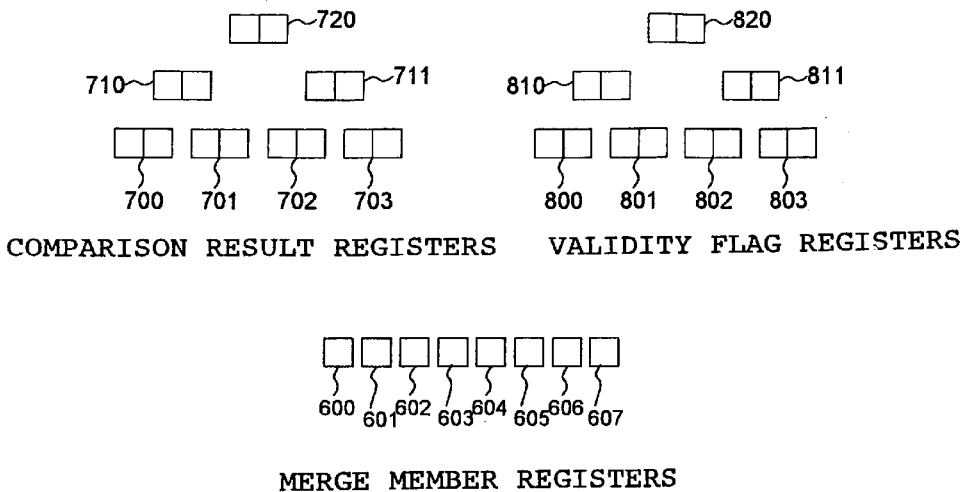
Fig. 5
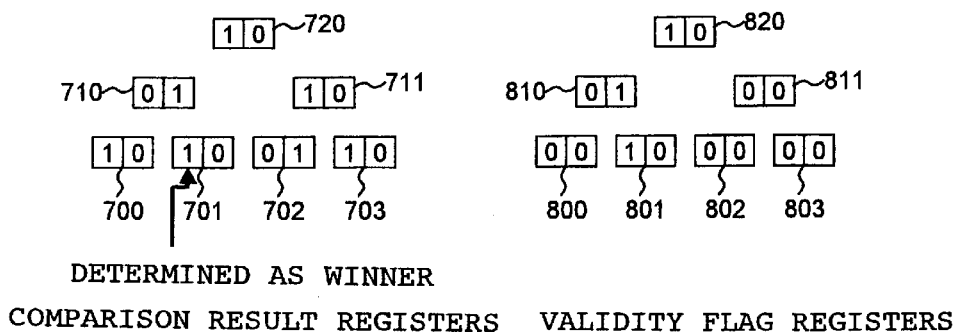
Fig. 6
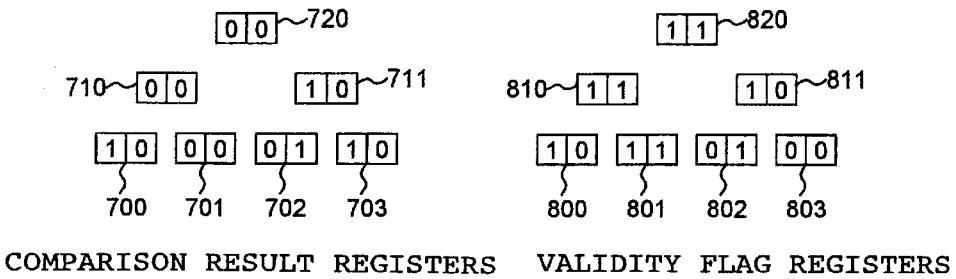
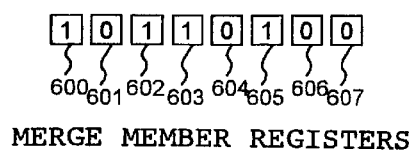
Fig. 7

INPUT TO SORT PROCESSOR 1000     ⑭ ⑨ ⑩ ⑦ ③ ② ⑥ ⑪ ① ⑬ ④ ⑯ ⑫ ⑤ ⑮ ⑧

OUTPUT FROM SORT PROCESSOR 1000     ⑨ ⑭ ⑦ ⑩ ② ③ ⑥ ⑪ ① ⑬ ④ ⑯ ⑤ ⑫ ⑧ ⑮

OUTPUT FROM SORT PROCESSOR 1001     ⑦ ⑨ ⑩ ⑭ ② ③ ⑥ ⑪ ① ④ ⑬ ⑯ ⑤ ⑧ ⑫ ⑮

OUTPUT FROM SORT PROCESSOR 1002     ② ③ ⑥ ⑦ ⑨ ⑩ ⑪ ⑭ ① ④ ⑤ ⑧ ⑫ ⑬ ⑮ ⑯

OUTPUT FROM SORT PROCESSOR 1003     ① ② ③ ④ ⑤ ⑥ ⑦ ⑧ ⑨ ⑩ ⑪ ⑫ ⑬ ⑭ ⑮ ⑯

Fig. 11

MERGE SORTING APPARATUS WITH COMPARISON NODES CONNECTED IN TOURNAMENT TREE SHAPE

BACKGROUND OF THE INVENTION

1. Field of the Invention

The present invention relates to a system for merge sorting, i.e., data sequencing by comparison of number size, using database processing hardware.

2. Description of the Related Art

Generally, a record that is an element of a database consists of a plurality of fields. The process of sequencing records in an ascending or descending order using a particular field as a key is referred to as sorting. The process of reorganizing a plurality of sorted record arrays into one sorted record array is referred to as merging.

When performing sorting or merging using software, as a large amount of data is transferred within a processor, a memory, and a supplementary memory device such as a disk, a great deal of processing time is required. In contrast, a hardware pipeline merge sorting device can be provided to perform sorting at a high speed.

FIG. 10 is a block diagram showing a configuration of a pipeline merge sorting device described, for example, in "VLSI Sort Processor" (Information Processing, Vol. 31, No.4, 1990). FIG. 10 includes linearly connected sort processors 1000, 1001, 1002, and 1003, and memory units 1010, 1011, 1012, and 1013 connected to respective sort processors.

In the pipeline merge sorting device, the $n^{th}$ sort processor receives from the $n-1^{th}$ sort processor an input of two sets of sorted record arrays each comprising $2^{n-1}$ records. The $n^{th}$ sort processor merges the two sets of record arrays and outputs one set of sorted record array comprising $2^n$ records. The first record array of the two sets of record arrays is stored in the memory units connected to respective sort processors. The sorting process using the pipeline merge sorting device is shown in FIG. 11.

FIG. 11 illustrates an example of transitional changes a record array undergoes when processed by two-way merge sorting. Generally in K-way merge sorting, the $n^{th}$ sort processor receives from the $n-1^{th}$ sort processor an input of K sets of sorted record arrays each comprising $K^{n-1}$ records. The $n^{th}$ sort processor merges the K sets of record arrays and outputs one set of sorted record array comprising $K^n$ records.

FIG. 12 is a diagram showing a configuration of a sort processor performing 8-way merge sorting using a tournament tree system. FIG. 12 includes comparison nodes 1100–1120, eight registers 1200–1207 retaining data to be introduced into the tournament circuit, and a register 1210 retaining data winning a comparison. Data from registers 1200 and 1201 are input to the comparison node 1100 corresponding to a first round match of the tournament. The output from this node 1100 serves as one of the two inputs to the comparison node 1110 corresponding to a second round match. As the other input to the node 1110, the output from the comparison node 1101 corresponding to a different first round match is received. The output from the node 1100 serves as one of the two inputs to the comparison node 1120 corresponding to the third round match, or the final round. The output from the node 1120 serves as the input to the register 1210.

FIG. 13 is a block diagram illustrating in greater detail a comparison node shown in FIG. 12. Both data X and data Y serve as inputs to the comparator 1500 and the selector 1510. Selection is performed in the selector 1510 in accordance with the comparison result from the comparator 1500. The selector 1510 then outputs data Z.

The operation performed in the configuration of FIGS. 12 and 13 will now be explained. A sorted record array, such as the one shown in FIG. 4, is input word by word to the input registers 1200–1207. Each of the records in a record array comprises a key and a main record portion. Initially, the first word of the key of each foremost record in record arrays 0–7 is set in each of the registers 1200–1207, and respective subsequent words are sequentially set in the registers as necessary.

However, in conventional 8-way merge sorting, eight record arrays must constantly be supplied to the input registers 1200–1207. Record arrays are generally stored in a common memory and read out via a common data path. As the eight record arrays constantly vie for readout, merge-sorting performance is degraded.

To prevent such performance degradation, Japanese Patent Laid-Open Publication No. Hei 4-247571 discloses a data processing apparatus with an improved exchange and selection system, wherein, for example, 16-way merge sorting is executed by constantly comparing five records. This execution process corresponds to executing 8-way merge sorting by comparison of four records.

The above art, however, requires processes for initializing the registers comprising the tournament tree, for which extra clock cycles are necessary. More specifically, in 8-way merge sorting, for example, an extra clock cycle is inserted after every eight records in the first sort processor of the pipeline merge sorting device. This insertion may lead to performance degradation of the entire pipeline merge sorting device.

As such, in conventional K-way merge sorting, there remains the problem of performance degradation due to either the contending readouts of record arrays from memory or the requirement of extra clock cycles for initializing the registers of the tournament tree.

SUMMARY OF THE INVENTION

The present invention was created in an attempt to solve the above-described problem. The object of the present invention is to provide a merge sorting apparatus capable of performing merge sorting at a high speed.

To accomplish this object, the merge sorting apparatus of the present invention for sequencing records including one or more data items in an ascending or descending order by comparing the data items sequentially set in a plurality of input registers in every predetermined processing cycle, comprising a comparison tournament circuit having a plurality of comparison nodes connected in a tournament tree shape thereby forming a plurality of pathways starting with each of said input registers, each of said plurality of comparison nodes outputting one of two input data items as a result of performing a comparison processing of the two input data items and further outputting a comparison result of said comparison processing; and a comparison control circuit for determining, in accordance with the comparison results output by said comparison nodes, setting of validity flag information indicating validity of a data item to be subsequently input into each of said comparison nodes, and for supplying said determined validity flag information to corresponding each of said comparison nodes; wherein, in the following processing cycle, when the validity flag information transmitted from said comparison control circuit to each of said comparison nodes indicates that both of the two input data items are valid, each of said comparison nodes determines which input data item to output based on relative number sizes of the input data items and outputs the determined input data item, when the validity flag information indicates that only one of the two input data items is valid, each of said comparison nodes outputs said one of the input data items, and, when the validity flag information indicates that both of the two input data items are invalid, each of said comparison nodes outputs no input data items; and said comparison control circuit sets the validity flag information corresponding to the input data item not output in the data comparison processing to indicate invalidity, and, upon completion of a record comparison processing, sets the validity flag information corresponding to each of the input data items in each of said comparison nodes to indicate validity when the validity flag information corresponding to the comparison nodes connected at a stage below and outputting input data items to said each of said comparison nodes indicates validity, thereby allowing execution of merge sorting without initializing said comparison tournament circuit for every record comparison processing.

Each of said comparison nodes may comprise a comparator for comparing number sizes of two input data items, and a selector for outputting either one of the two input data items in accordance with a comparison result from said comparator and a validity flag information received from said comparison control circuit.

Said comparison control circuit may further include comparison result retaining means for retaining the comparison results received from each of said comparison nodes, wherein, each time a comparison result is received from each of said comparison nodes, said comparison result retaining means retains the comparison result; and, when a pathway is determined as the tournament winning path in said comparison tournament circuit, a comparison result from each of said comparison nodes in that pathway retained in said comparison result retaining means is initialized.

In addition, said comparison control circuit may comprise validity flag information retaining means for retaining the validity flag information for each of said comparison nodes excluding the comparison nodes located at the bottom-most stage of said comparison tournament circuit; wherein said validity flag information retaining means is set to indicate validity when at least one of the validity flag information retaining means corresponding to the comparison nodes connected at a stage below the corresponding comparison node is set to indicate validity, and is set to indicate invalidity when a competing input data item to the corresponding comparison node wins or when a competing input data item wins in a comparison node connected at a stage higher than said comparison node.

Furthermore, said comparison control circuit may comprise processing pathway retaining means for retaining information indicating whether or not a data item input to an input register corresponding to each pathway is an object of processing in a subsequent data comparison processing; wherein, in said processing pathway retaining means, a data item input to an input register corresponding to a pathway passed by a tournament winner data item in the immediately preceding data comparison processing or a pathway wherein only one loss was determined in one of the comparison nodes located in that pathway during the immediately preceding data comparison processing is indicated as valid in the following data comparison processing, and a data item input to an input register corresponding to a pathway after a loss is determined in one of the comparison nodes located in that pathway is indicated as invalid in the following data comparison processing.

According to the present invention, merge sorting can be performed faster because performance degradation that conventionally occurs in K-way merge sorting due to the contending readouts of record arrays from memory and the initialization processes of the tournament tree registers is prevented.

Furthermore, as the comparison nodes of the present invention are provided with selectors, a win or loss can be determined in one data processing cycle of the comparison tournament circuit.

BRIEF DESCRIPTION OF THE DRAWINGS

FIGS 3(a) and 3(b) show truth values indicating an operation of a comparison node according to the present invention.

FIG. 5 illustrates the configuration of register groups in the comparison control circuit according to the present invention.

FIG. 6 shows a first state of the registers in the comparison control circuit according to the present invention.

FIG. 7 shows a second state of the registers in the comparison control circuit according to the present embodiment.

FIG. 11 is a diagram for explaining an operation process of the pipeline merge sorting device.

DESCRIPTION OF PREFERRED EMBODIMENT

An embodiment of the present invention is described below referring to the accompanying drawings.

Figure 1:
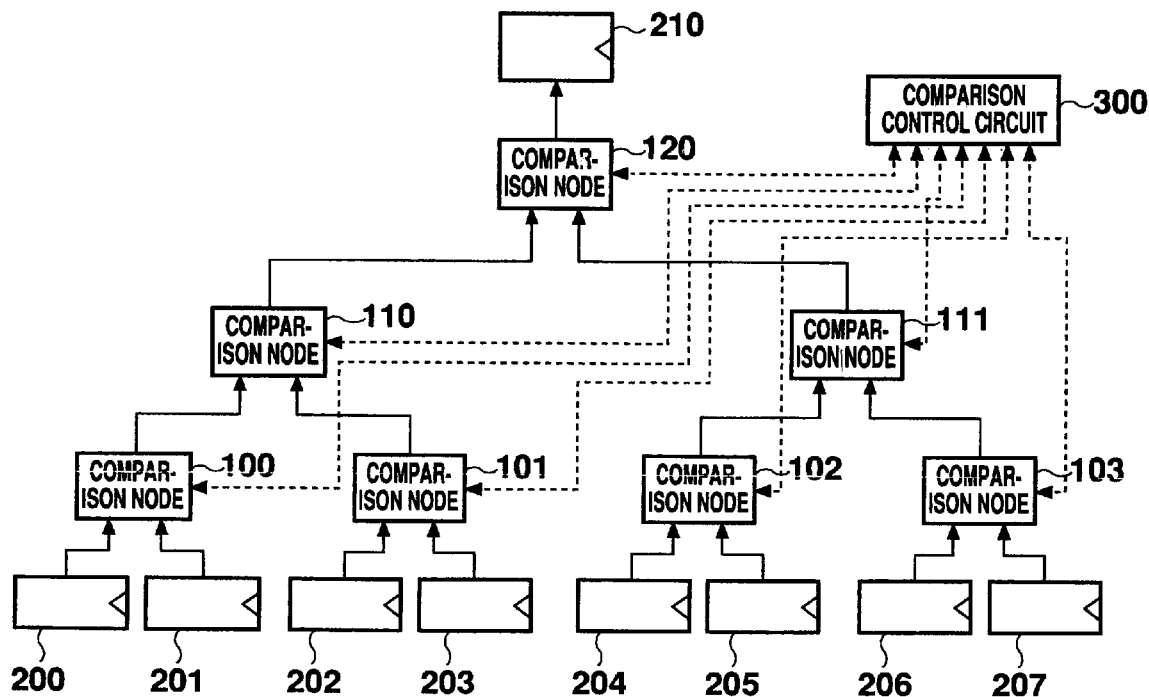
FIG. 1 is a block diagram illustrating an embodiment of a merge sorting apparatus according to the present invention.

FIG. 1 is a block diagram illustrating one embodiment of a merge sorting apparatus according to the present invention performing 8-way merge sorting by way of example. The following description will be based on an example sequencing process in an ascending order.

FIG. 1 shows comparison nodes 100–103, 110–111, and 120, input registers 200–207, an output register 210, and a comparison control circuit 300. Each of the comparison nodes 100–120 outputs one of two input data items in accordance with a comparison result of the two input data items and validity flag information received from the comparison control circuit 300 concerning the input data items. By connecting these comparison nodes in a tournament tree arrangement, a comparison tournament circuit having pathways starting with the input registers 200–207 is formed. The input registers 200–207 retains data items to be introduced into this comparison tournament circuit. The output register 210 retains the winner of one cycle of data comparison processing.

According to the comparison tournament circuit shown in FIG. 1, data items from the registers 200 and 201 are input to the comparison node 100 corresponding to a first round match. The output from the comparison node 100 serves as one of the two inputs to the comparison node 110 of a second round match. As the other input to the comparison node 110, the output from the comparison node 101 corresponding to a different first round match is received. The output from the comparison node 110 serves as one of the two inputs to the comparison node 120 corresponding to the third round match, or the final round. As the other input to the comparison node 120, the output from the comparison node 111 corresponding to another second round match is received. Respective outputs from comparison nodes 102 and 103 serve as the two inputs to the comparison node 111. The output from the comparison node 120 serves as the input to the output register 210.

The comparison control circuit 300 exchanges control information with each of the comparison nodes 100–120. More specifically, the comparison control circuit determines validity of input data items in each of the comparison nodes 100–120 in accordance with the received comparison results from the comparison nodes 100–120, and supplies to each of the corresponding comparison nodes 100–120 validity flag information indicating validity of the input data items in each of the comparison nodes 100–120.

Figure 2:
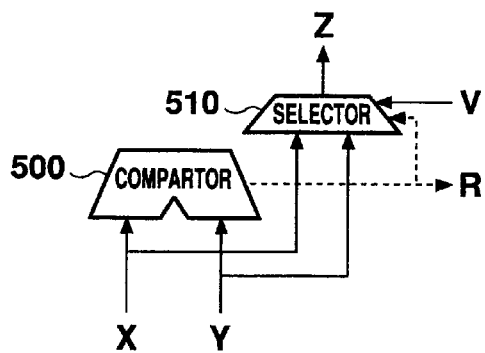
FIG. 2 is a diagram showing an internal configuration of a comparison node according to the present invention.

FIG. 2 is a diagram showing an internal configuration of a comparison node according to the present embodiment. The basic configuration of each comparison node shown in FIG. 1 is equivalent to that of the comparison node shown in FIG. 2. A comparator 500 compares the number sizes of two input data X and Y, and outputs the comparison result as a signal R. A selector 510 performs a selection based on the signal R from the comparator 500 and a signal V from the comparison control circuit 300 indicating validity flag information, and outputs either one of the input data X or Y as data Z. In the present embodiment, since the selector 510 is employed in a comparison node instead of a register, winning data can be determined in one process cycle in the comparison tournament circuit.

FIGS. 3(a) and 3(b) are tables of truth values indicating an operation of a comparison node according to the present embodiment. A signal R comprises two bits, wherein "10" indicates the winning of data X, "01" indicates the winning of data Y, and "00" indicates a tie. A signal V transmitted from the comparison control circuit 300 similarly comprises two bits, each of which indicates whether or not each of the input data X and Y is valid. In the case that the signal V is "11", meaning that both of the data items X and Y are valid, the winning one of the data items indicated by the signal R is output as data Z. In the above case, when the signal R indicates a tie, either data item can be output. When only one of the data items X and Y is valid, the valid one serves as the output Z. When neither of the data items X or Y is valid, either one can be output.

Figure 4:
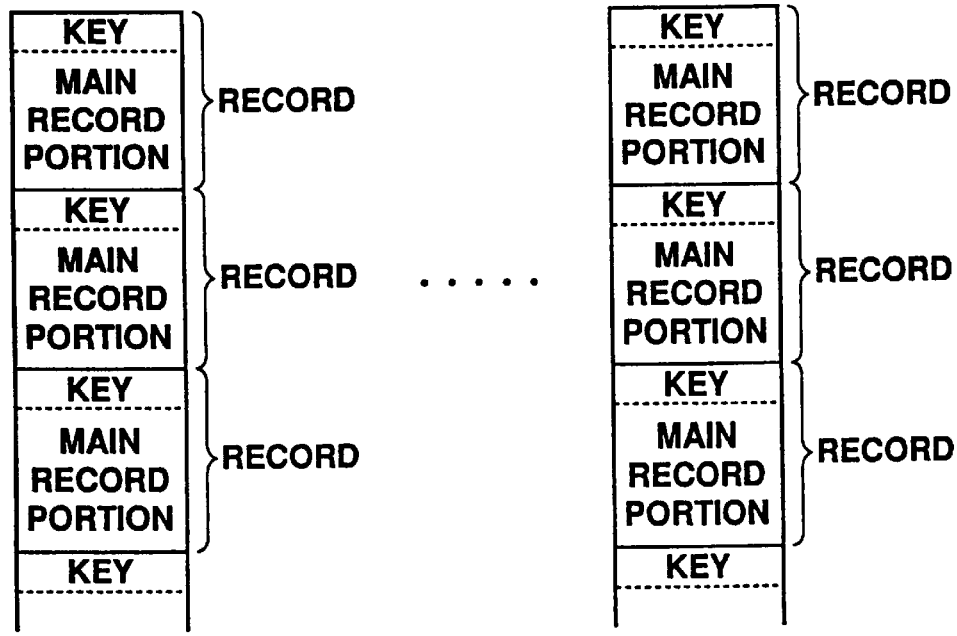
FIG. 4 illustrates an example of a configuration of a record to be compared and merge-sorted in the present embodiment.

FIG. 4 shows an example of a structure of a record to be compared and merge-sorted in the present embodiment. Each of record arrays 0–7 is constituted by sorted records, and each of the records includes a key and a main record portion. Into each of the input registers 200–207, a corresponding one of the sorted record arrays 0–7 is input, word by word, beginning with the first word. More specifically, the first word of the key of the foremost record in each of the record arrays 0–7 is initially input to respective input registers 200–207. Data indicating subsequent single words of respective records is then sequentially set in the registers as necessary. For example, if a record consists of a total of four words, including one word as a key and three words as main record portion, the key is initially input, to be followed in order by the first word, the second word, and the third word of the main record portion. In the present example, the size of data to be processed in one cycle of comparison processing equals the capacity of each of the input registers 200–207 and the bus width of the comparison tournament circuit, namely, one word. The term "data" used in this embodiment does not refer to an entire record, but instead refers to one-word-long data consisting a record that is compared in one cycle of comparison processing. This one cycle of comparison processing is referred to as data comparison processing. In the present example, comparison processing of one record is completed when data comparison processing is performed for four words by four cycles. This comparison processing comprising data comparison processing for four words is referred to as record comparison processing. If a size of a record equals one word, the terms "record" and "data" can be used interchangeably.

FIG. 5 shows the configuration of register groups in the comparison control circuit 300 according to the present embodiment. The comparison control circuit 300 comprises merge member registers 600–607, comparison result registers 700–720, and validity flag registers 800–820.

The comparison result registers 700–720 serve as comparison result retaining means for retaining comparison results received from each of the comparison nodes 100–120. Each value to be retained is determined by a signal R from respective comparison nodes 100–120.

The merge member registers 600–607 serve as processing pathway retaining means for retaining information indicating whether or not a data item input to an input register 200–207 corresponding to each pathway is an object of processing in the following data comparison processing.

The validity flag registers 810, 811, and 820, namely, the validity flag registers 800–820 excluding ones corresponding to comparison nodes located in the bottom-most, i.e., earliest stage of the comparison tournament circuit, serve as validity flag information retaining means for retaining validity flag information for respective comparison nodes 110, 111, and 120.

The merge member registers 600–607 and the validity flag registers 810, 811, and 820 are sources of values for the signal V to be supplied to respective comparison nodes 100–120. The merge member registers 600–607 are similar to the validity flag registers 810, 811, and 820 in that they also retain validity flag information. The merge member registers 600–607 are therefore illustrated in the figures as validity flag registers 800–803. In other words, the validity flag registers 800–803 are substantially the same elements as the merge member registers 600–607.

Basic operations of setting and resetting respective registers of the comparison control circuit 300 will next be described in detail.

Each of the comparison result registers 700–720 comprises two bits, with each bit responding to inputs from corresponding one of the comparison nodes 100–120. For example, the comparison result register 700 corresponds to the comparison node 100. The comparison result register 700 receives a signal R from the comparison node 100 indicating the winning of either data X or data Y, and retains this information. When neither of two compared records is determined as winning over the other record upon completion of record comparison (in the above example, when it cannot be determined as to which number size is smaller upon completing the comparison of data of respective last fourth words), data X is assumed to have won and the comparison result register is set to indicate as such. In the present example, winning is indicated by "1". The above process similarly applies to the comparison result registers 701–720. For example, when the record array 2 is determined the tournament winner, the values of the comparison result registers are set as shown in FIG. 6.

When a subsequent record comparison processing is started and, for example, the record array 0 or record array 1 was determined the tournament winner in the immediately preceding record comparison processing, the corresponding portions of the comparison result registers 700, 710, and 720 are reset. If the record array 2 or record array 3 was determined the tournament winner in the preceding record comparison processing, the corresponding portions of the comparison result registers 701, 710, and 720 are reset. If the record array 4 or 5 was determined the tournament winner in the preceding record comparison processing, the corresponding portions of the comparison result registers 702, 711, and 720 are reset. If the record array 6 or 7 was determined the tournament winner in the preceding record comparison processing, the corresponding portions of the comparison result registers 703, 711, and 720 are reset. More specifically, if the register state is as shown in FIG. 6 upon completion of a record comparison processing, the comparison registers 701, 710, and 720 are reset at the start of the subsequent record comparison processing to indicate values as shown in FIG. 7.

The merge member registers 600–607 correspond to respective record arrays 0–7. Each of the merge member registers is set before starting a subsequent record comparison processing when the preceding record of the corresponding record array was determined the tournament winner. Each of the merge member registers is also set before starting a subsequent record comparison processing when a loss resulted in only one of the comparison nodes located in the pathway of the corresponding record array, or, more specifically, when winning resulted in two of the three comparison nodes in the corresponding pathway from the first to third round. Based on the example illustrated in FIG. 6, the merge member registers 600, 602, 603, and 605 are set as shown in FIG. 7. The merge registers 600–607 are reset when, in the subsequent record comparison processing, a loss is determined in a comparison node in the corresponding pathway, or, more specifically, when a loss is determined in the first round, or a win in the first round and a loss in the second round are determined, or wins in the first and second rounds and a loss in the third round are determined.

Each of the validity flag registers 800–820 comprises two bits, with each bit responding to an input from a corresponding one of the comparison nodes 100–120. A value of a validity flag register is transmitted to a comparison node as a signal V. Respective two bits of each of the validity flag registers 800–803 located in the bottom-most stage are substantially the same elements as the merge member registers 600–607, as explained above.

Setting of the validity flag registers 800–820 is executed in the following manner upon completion of a record comparison processing. To illustrate with an example, the left-side bit of the validity flag register 810 is set when at least one of the two bits comprising the validity flag register 800 located in the stage below the concerned left-side bit is set. During each of the data comparison processing included in the subsequent record comparison processing, the left-side bit of the validity flag register 810 is reset when the input Y wins in the comparison node 110, or when the input X wins in the comparison node 110 and the input Y wins in the comparison node 120. Similar processes apply to the other bit of the validity flag register 810 and the two bits of the validity flag register 811. In a like manner, the left-side bit of the validity flag register 820 is set when at least one of the two bits comprising the validity flag register 810 located in the stage below the concerned left-side bit is set. During each of the data comparison processing included in the subsequent record comparison processing, the left-side bit of the validity flag register 820 is reset when the input Y wins in the comparison node 120. When the register state is as shown in FIG. 6 upon completion of a record comparison processing, immediately afterwards the values of the validity flag registers 800–820 are set as shown in FIG. 7.

The sequential procedure of record comparison processing is explained in the following using an illustrated example wherein one record comprises four words.

At the start of the operation of the merge sorting apparatus, the registers of the comparison control circuit 300 are initialized. As a result, the comparison result registers 700–720 indicate "00", while the validity flag registers 800–820 indicate "11" meaning that both data X and Y are valid.

In the first cycle, data of the foremost one word (in this example, the key) from each sorted record array such as shown in FIG. 4 is input to the input registers 200–207. The comparison tournament circuit immediately determines the relative number sizes of the input data, and sets the finally selected data in the output register 210. As the comparison nodes 100–120 of the present embodiment employ selectors, a win or loss can immediately be determined within this cycle. The data input to the output register 210 is directly output to be transferred and stored in a buffer not shown. No special cycle is necessary for this output process. As both data X and Y are valid according to signals V, the smaller of the two is selected in each of the comparison nodes 100–120. Concurrently, signals R are output from respective comparison nodes 100–120, and the comparison result registers 700–720 of the comparison control circuit 300 are set reflecting this information. For example, when X<Y and data X was selected in a comparison node, the corresponding comparison result register is set as "10". When X=Y, the comparison result register is set as "00", regardless of the value of the selected data.

During the first cycle of data comparison processing, namely, the processing for respective first words, the number size of data Y input from the record array 5 (input register 205) is, for example, larger than the number size of data X input from the record array 4 (input register 204), and, consequently, the data Y in the record array 5 is not selected. At this point, with respect to the records of the compared record arrays 4 and 5, the winner of the two is already determined and the data comparison processing for the second and further subsequent words is not required. In addition, the data Y in the record array 5 is determined the loser in the first round. In such a case, according to the present embodiment and example, the validity flag register 802 corresponding to the comparison node 102 is changed to "10". The signal V indicating "10" is transmitted to the comparison node 102 during the subsequent data comparison processing for the second to fourth words, thereby inhibiting selection of data Y. It can be seen from FIG. 3(*b*) that, when the signal V indicates "10", only data X is selected, regardless of the number sizes of data X and Y of the second and further subsequent words. If X>Y for the first words, identical operation is performed with the flag values reversed in each of the registers. In the case that X=Y for the first words, the winner is yet to be determined based on the results for the second or further subsequent words. Accordingly, the comparison result register is set as "00", while the validity flag register maintains its initialized value of "11" indicating that both data X and Y to be subsequently input are valid.

As such, each of the comparison nodes 100–120 performs comparison processing on input data in accordance with the preset validity flag information (signal V) received from the comparison control circuit 300, then selects and outputs one data packet. Concurrently, the comparison nodes transmits the signal R indicating the comparison result to the comparison control circuit 300. In the comparison control circuit 300, the comparison results received from respective comparison nodes 100–120 are retained in the comparison result registers 700–720, while the validity flag registers 800–820 are updated based on those comparison results. Based on the content of the updated validity flag registers 800–820, namely, the validity flag information, each of the comparison nodes 100–120 executes the subsequent data comparison processing.

Basically, one record comparison processing is completed by repeating the above-described process for four cycles. Although there are cases when a tournament winner record is determined without performing four cycles, processing corresponding to four cycles must be executed for transmitting to the output register 210 the remaining data of the winner record input to the input registers. The data processing of the remaining data, which are the second and further subsequent words, only involves transmitting the data from the input registers 200–207 to the output register 210. When no record is determined the tournament winner in the first cycle, the determination will be made in the subsequent cycles. In the present embodiment, subsequent cycles of data comparison processing are executed only for the record arrays for which neither win nor loss was determined. A win or loss is determined by or before the data comparison processing for respective last words. More specifically, when a win is determined in the second or third cycle, the validity flag information for the loser is reset to thereby exclude the corresponding record arrays from the object of data comparison processing in the subsequent cycles, as aforementioned. When two records having identical values are found, either one of the records can be treated as winning according to a predetermined rule.

Data comparison processing for four words equivalent to one cycle of record comparison processing may be completed as described above. At this point, if, for example, the record array 2 was determined the tournament winner, the registers of the comparison control circuit 300 indicate as illustrated in FIG. 6.

The winner data of each data comparison processing is transferred and stored in the buffer. Employing four cycles, the same number of cycles required for the record comparison processing, the final winner record is output. During these cycles, the register groups of the comparison control circuit 300 of the present embodiment are updated as described below in preparation for the subsequent record comparison processing. This updating process of the register groups of the comparison control circuit 300 is instantly executed between the processing of two records. The updated settings of respective registers for the subsequent record comparison processing are shown in FIG. 7.

As previously explained concerning the comparison result registers 700–720, those comparison result registers corresponding to the comparison nodes located in the pathway of the tournament winner record array are reset. If the record array 2 was the tournament winner in the preceding record comparison processing, the corresponding sides, namely, the left, right, and left sides, respectively, of the comparison result registers 701, 710, and 720 corresponding to the comparison nodes 101, 110, and 120 in the record array's pathway, are reset as illustrated in FIG. 6. Other comparison result registers are maintained unchanged.

As previously explained, each of the merge member registers 600–607 are set when, in the preceding record comparison processing, the corresponding record array won the tournament or winning resulted in the corresponding sides of two of the three comparison nodes of the first to third rounds located in the record array's pathway. In the above example, winning resulted in the corresponding sides of the comparison nodes in the first and third rounds in the pathway of the record array 0. The record array 2 was the tournament winner. Winning resulted in the second and third rounds in the pathway of the record array 3. The record array 5 won in the first and second rounds. Accordingly, the merge member registers 600, 602, 603, and 605 corresponding to those record arrays are set.

Among the validity flag registers 800–820, the validity flag registers 800–803 are set at the same values as the merge member registers 600–607, as they are substantially the same elements as the merge member registers 600–607. The bits of the validity flag registers 810–820 are set when at least one of the two bits of the validity flag register located in the lower stage of the concerned bit's pathway is set. In the present example, all bits of the validity flag registers 810–820 except the right-side bit of the validity flag register 811 are set, as illustrated in FIG. 7.

Figure 8:
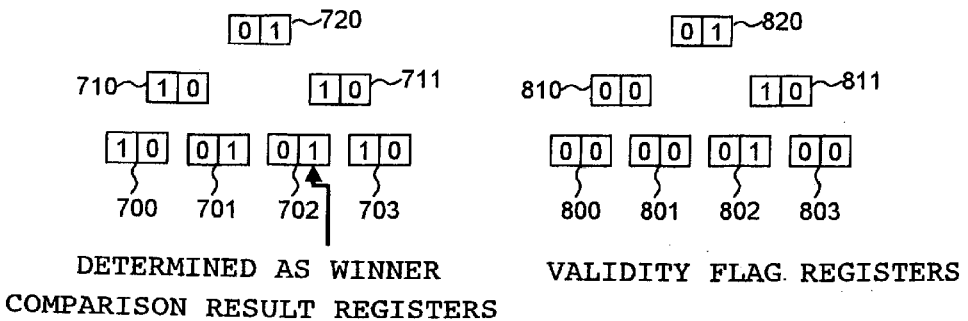
FIG. 8 shows a third state of the registers in the comparison control circuit according to the present embodiment.
Figure 9:
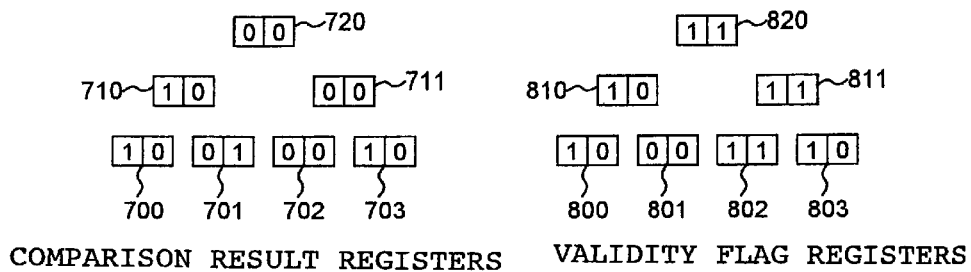
FIG. 9 shows a fourth state of the registers in the comparison control circuit according to the present embodiment.
Figure 10:
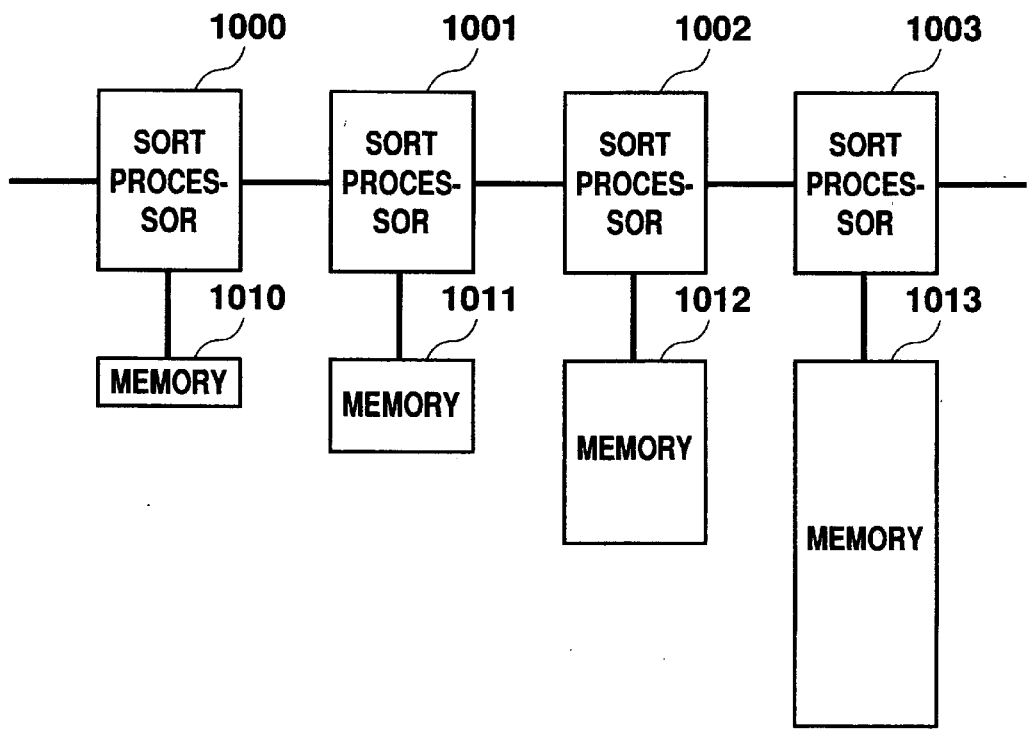
FIG. 10 is a block diagram illustrating a pipeline merge sorting device.
Figure 12:
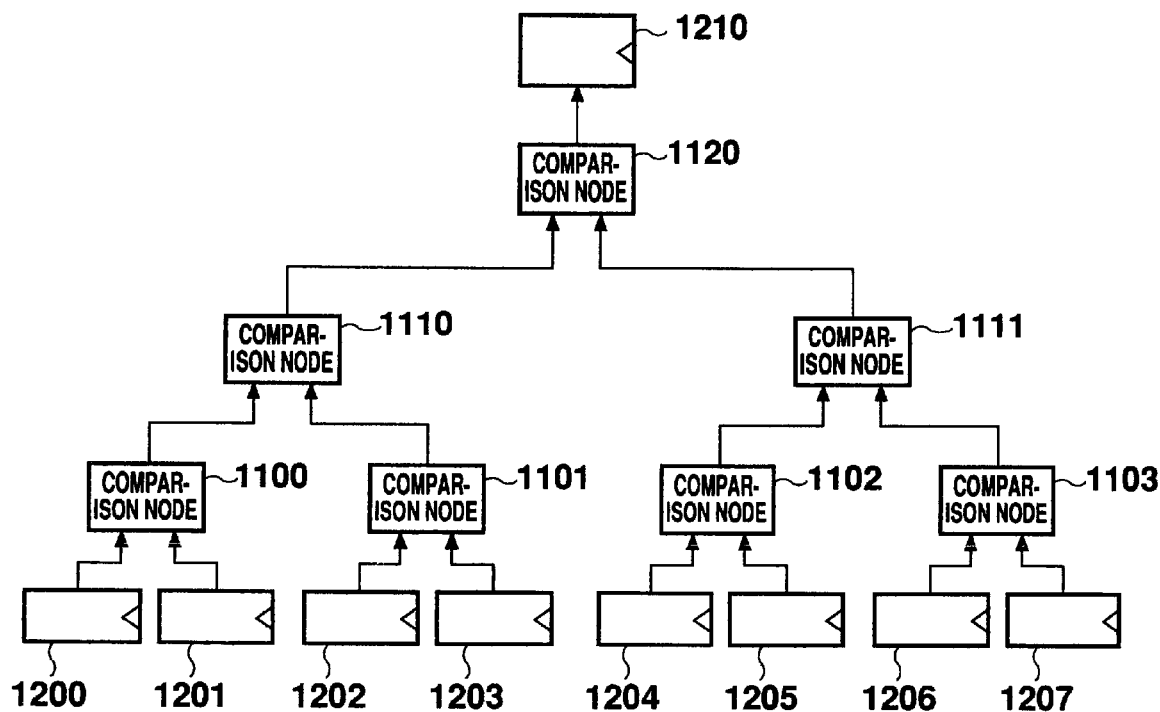
FIG. 12 is a block diagram illustrating a conventional comparison tournament circuit.
Figure 13:
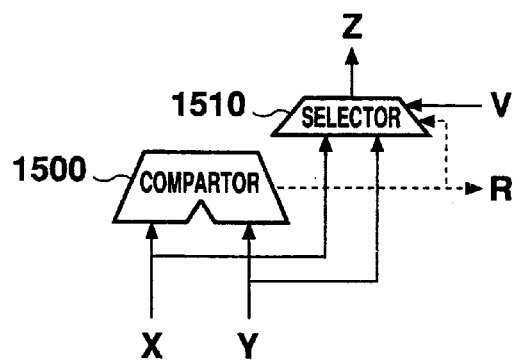
FIG. 13 is a block diagram illustrating a conventional comparison node.

The subsequent record comparison processing is performed starting with the foregoing register state. FIG. 8 shows the resulting register state in the case that the record array 5 won the next tournament. The subsequently updated settings of the registers of the comparison control circuit 300 are shown in FIG. 9.

By providing each of the above registers in the comparison control circuit 300, and setting and resetting the registers in a predetermined timing as described above, the following advantages can be attained by the present embodiment.

In the 8-way merge sorting device illustrated above, although comparison is initially executed for record arrays corresponding to all of the eight pathways, subsequently only four record arrays must be compared. In FIG. 7, only the record arrays 0, 2, 3, and 5 are compared, and in FIG. 9, only the record arrays 0, 4, 5, and 6 are compared. This means that, to determine a subsequent winner, successive data need only be supplied to the input registers corresponding to those four arrays. Inversely stated, it is unnecessary to supply successive data to the input registers corresponding to the other four record arrays. Generally, record arrays are stored in a common memory and read out via a common data path, causing, in the case of 8-way merge sorting, a constant contention in reading out eight record arrays. According to the present invention, this constant contention for readout can be limited to four record arrays based on the explanation below.

When, for example, the record array 2 is the tournament winner as shown in FIG. 6, the records that became a loser as a result of direct comparison with the data of record array 2 may have the second smallest value among the records input by the eight input registers. Accordingly, the record arrays of these records have the possibility to become the tournament winner in the subsequent record comparison processing and must be maintained as objects of comparison. In addition, the subsequent record to be read out from the preceding tournament winner array must also be maintained as an object of comparison because such record similarly has the possibility to be the subsequent tournament winner. On the other hand, the records that became a loser as a result of comparison with the loser records directly compared with the data of record array 2 have at most the third smallest value in this record comparison processing. Accordingly, the record arrays of these records have no possibility to become the tournament winner in the subsequent record comparison processing, and therefore are not required to be maintained as the objects of comparison. In the present embodiment, this judgement concerning whether or not a record array must be maintained as the object of comparison is retained in the merge member registers 600–607. As such, unnecessary readouts from a common memory is prevented.

Additionally, in the present invention, a record in a record array that once lost in a data comparison processing is prevented from winning during the subsequent data comparison processing within the same record comparison processing based on other data comprising the record. Information concerning this prevention is retained in the validity flag registers 810–820 as validity flag information. Although the present embodiment illustrated the case where one record comprises four words including a one-word key and three words of main record portion, merge sorting can be reliably and rapidly executed by performing the foregoing prevention process similarly in cases where records have any number of words, including only one word. More specifically, according to the present invention, each of the registers of the comparison control circuit 300 is not required to be initialized for every record comparison, eliminating the need for any special initializing cycles.

While K number of record arrays are in contention to be read out in conventional K-way merge sorting, the present embodiment allows the contention to be limited to ($\log_2 k+1$) number of arrays, alleviating memory readout bottleneck situation. Moreover, special initializing cycles are not required for every record comparison. It is possible to provide a separate buffer for each pathway as a data supplying source to respective input registers 200–207 of the present embodiment, and thereby prevent contention in supplying data to input registers. However, data would still be supplied to the buffers from a common memory. Additionally, there are cases when the size of the keys shown in FIG. 4 exceeds the buffer size and therefore the readout contention of the record arrays cannot be avoided by the buffers. The present invention can also be used with such an arrangement.

Although the present embodiment illustrated a sequencing process in an ascending order, a sequencing in a descending order can similarly be executed by reversing the comparison results. Furthermore, the processing pathway retaining means, comparison result retaining means, and validity flag information retaining means are illustrated to comprise registers because all information retained in the comparison control circuit 300, such as the comparison results from each of the comparison nodes 100–120 and validity flag information, can be indicated by one bit. However, these means are not restricted to the inclusion of registers.

What is claimed is:

1. A merge sorting apparatus for sequencing records including one or more data items in an ascending or descending order by comparing the data items set sequentially in a plurality of input registers, in each of a plurality of process cycles, the apparatus comprising:

a plurality of input registers;

a comparison tournament circuit having a plurality of comparison nodes connected in a tournament tree shape from an earliest stage to a latest stage, thereby forming a plurality of pathways starting with input registers, each of said plurality of comparison nodes outputting one of two data items as a result of a comparison of the two input data items and further outputting a comparison result of the comparison; and a comparison control circuit for determining, in accordance with the comparison result output by said comparison nodes, setting of validity flag information indicating validity of a data item to be subsequently input into each of said comparison nodes, and for supplying the determined setting of the validity flag information to corresponding comparison nodes wherein, in a subsequent processing cycle, when the validity flag information transmitted from said comparison control circuit to each of said comparison nodes indicates that both of the two input data items are valid, each of said comparison nodes determines which of the two data items to output based on relative number sizes of the input data items and outputs the input data items so determined, when the validity flag information indicates that only one of the two input data items is valid, each of said comparison nodes outputs the input data item determined to be valid, and when the validity flag information indicates that both of the two input data items are invalid, each of said comparison nodes outputs no input data item, and said comparison control circuit sets the validity flag information corresponding to the input data item not output in the data comparison to indicate invalidity, and, upon completion of a data comparison, sets the validity flag information corresponding to each of the input data items in each of said comparison nodes to indicate validity, when the validity flag information corresponding to said comparison nodes connected at an earlier stage and outputting input data items to each of said comparison nodes indicates validity, thereby allowing merge sorting without initializing said comparison tournament circuit for every record comparison.

2. The merge sorting apparatus of claim 1, wherein each of said comparison nodes comprises:

a comparator for comparing number sizes of two input data items; and a selector for outputting one of the two input data items in accordance with a comparison result from said comparator and the validity flag information received from said comparison control circuit.

3. The merge sorting apparatus of claim 1, wherein said comparison control circuit includes comparison result retaining means for retaining the comparison result received from each of said comparison nodes and, whenever a comparison result is received from each of said comparison nodes, said comparison result retaining means retains the comparison result, and, when a pathway is determined as a tournament winning path in said comparison tournament circuit, a comparison result for each of said comparison nodes in that pathway retained in said comparison result retaining means is initialized.

4. The merge sorting apparatus of claim 3, wherein said comparison result retaining means includes a group of two-bit registers corresponding to each of said comparison nodes.

5. The merge sorting apparatus of claim 1, wherein:

said comparison control circuit comprises validity flag information retaining means for retaining the validity flag information for each of said comparison nodes excluding the comparison nodes located at the earliest stage of said comparison tournament circuit; and said validity flag information retaining means is set to indicate validity when at least one of the validity flag information retaining means corresponding to said comparison nodes connected at an earlier stage comparison node is set to indicate validity, and is set to indicate invalidity when a competing input data item to the corresponding comparison node wins or when a competing input data item wins in a comparison node connected at a later stage comparison node.

6. The merge sorting apparatus of claim 5, wherein said validity flag information retaining means includes a group of two-bit registers corresponding to each of said comparison nodes, excluding said comparison nodes at the earliest stage of said comparison tournament circuit.

7. The merge sorting apparatus of claim 1, wherein:

said comparison control circuit comprises processing pathway retaining means for retaining information indicating whether a data item input to an input register corresponding to each pathway is an object of processing in a subsequent data comparison processing; and in said processing pathway retaining means, a data item input to an input register corresponding to a pathway passed by a tournament winner data item in an immediately earlier stage or a pathway in which only one loss was determined in one of the comparison nodes located in that pathway in the immediately earlier stage is indicated as valid in the following data comparison processing, while a data item input to an input register corresponding to a pathway after a loss is determined in one of the comparison nodes located in that pathway is indicated as invalid in the following data comparison.

8. The merge sorting apparatus of claim 7, wherein said processing pathway retaining means includes a group of one-bit registers corresponding to each of said pathways.

9. The merge sorting apparatus of claim 1, wherein said comparison control circuit comprises:

comparison result retaining means for retaining comparison results received from each of said comparison nodes;

validity flag information retaining means for retaining validity flag information concerning said comparison nodes, excluding the comparison nodes located at the earliest stage of said a comparison tournament circuit; and processing pathway retaining means for retaining information indicating whether a data item input to an input register corresponding to each pathway is an object of processing in an subsequent data comparison processing wherein, whenever a comparison result is received from each of said comparison nodes, said comparison result retaining means retains the comparison result, and, when a pathway is determined as the tournament winning path in said comparison tournament circuit, a comparison result for each of said comparison nodes in that pathway retained in said comparison result retaining means is initialized, said validity flag information retaining means is set to indicate validity when at least one of the validity flag information retaining means corresponding to said comparison nodes connected at an earlier stage comparison node is set to indicate validity, and is set to indicate invalidity when a competing input data item to the corresponding comparison node wins or when a competing input data item wins in a comparison node connected at a later stage comparison node; and in said processing pathway retaining means, a data item input to an input register corresponding to a pathway passed by a tournament winner data item in the immediately earlier stage or a pathway in which only one loss was determined in one of the comparison nodes located in that pathway during the immediately preceding data comparison is indicated as valid in subsequent data comparison, while a data item input to an input register corresponding to a pathway after a loss is determined in one of said comparison nodes located in that pathway is indicated as invalid in the subsequent data comparison.

10. The merge sorting apparatus of claim 9, wherein, said comparison control circuit treats said information retained by processing pathway retaining means identically with the validity flag information, and incorporates said processing pathway retaining means into said validity flag information retaining means as means for retaining validity flag information concerning the comparison nodes located at the earliest stage of said comparison tournament circuit.

11. The merge sorting apparatus of claim 9, wherein said comparison result retaining means includes a group of two-bit registers corresponding to each of said comparison nodes.

12. The merge sorting apparatus of claim 9, wherein said validity flag information retaining means includes a group of two-bit registers corresponding to each of said comparison nodes, excluding said comparison nodes at the earliest stage of said comparison tournament circuit.

13. The merge sorting apparatus of claim 9, wherein said processing pathway retaining means includes a group of one-bit registers provided corresponding to each of said pathways.

* * * * *